Rufus G. Hartig
INVENTOR.

BY Carl B. Fox, Jr.
ATTORNEY

United States Patent Office 3,574,542
Patented Apr. 13, 1971

3,574,542
PROCESS FOR RECOVERY OF HF AND $H_2SiF_6$
FROM GASES CONTAINING HF AND $SiF_4$
Rufus G. Hartig, 230 Hillsboro Hotel,
Dover, Fla. 33602
Filed Mar. 5, 1969, Ser. No. 804,519
Int. Cl. C01b 67/00, 7/22, 33/08
U.S. Cl. 23—153
2 Claims

ABSTRACT OF THE DISCLOSURE

Processes for recovery of HF and $H_2SiF_6$ from gas mixtures containing HF and $SiF_4$, wherein $SiF_4$ is recovered as $H_2SiF_6$, and HF is separately recovered.

BACKGROUND OF THE INVENTION

In processes for recovery of HF from gas streams by absorption of HF with NaF, to form $NaHF_2$, and subsequent distillation of HF therefrom, the reactions are interfered with by absorption of $SiF_4$ which reacts with HF to form $H_2SiF_6$, which in turn reacts with NaF to form $Na_2SiF_6$. This material contaminates the NaF and in addition results in contamination of the ultimately produced HF with $SiF_4$. The gases treated according to the invention are derived from phosphate plants of various types, and from other forms of chemical processes.

It is a principal object of this invention to provide, in HF recovery processes, methods for removal of $SiF_4$ from gas streams prior to HF recovery, in order that HF of higher purity may be produced and in order to prevent contamination of the absorbent material used in HF recovery. A further object of the invention is to provide such methods wherein all of the fluorine content of the incoming gas stream, whether in the form HF or $SiF_4$, is recovered as HF.

Other objects and advantages of the invention will appear from the detailed descriptions of the preferred embodiments, and from the drawings.

DETAILED DESCRIPTION OF THE PREFERRED EMBODIMENTS

Figure 1:
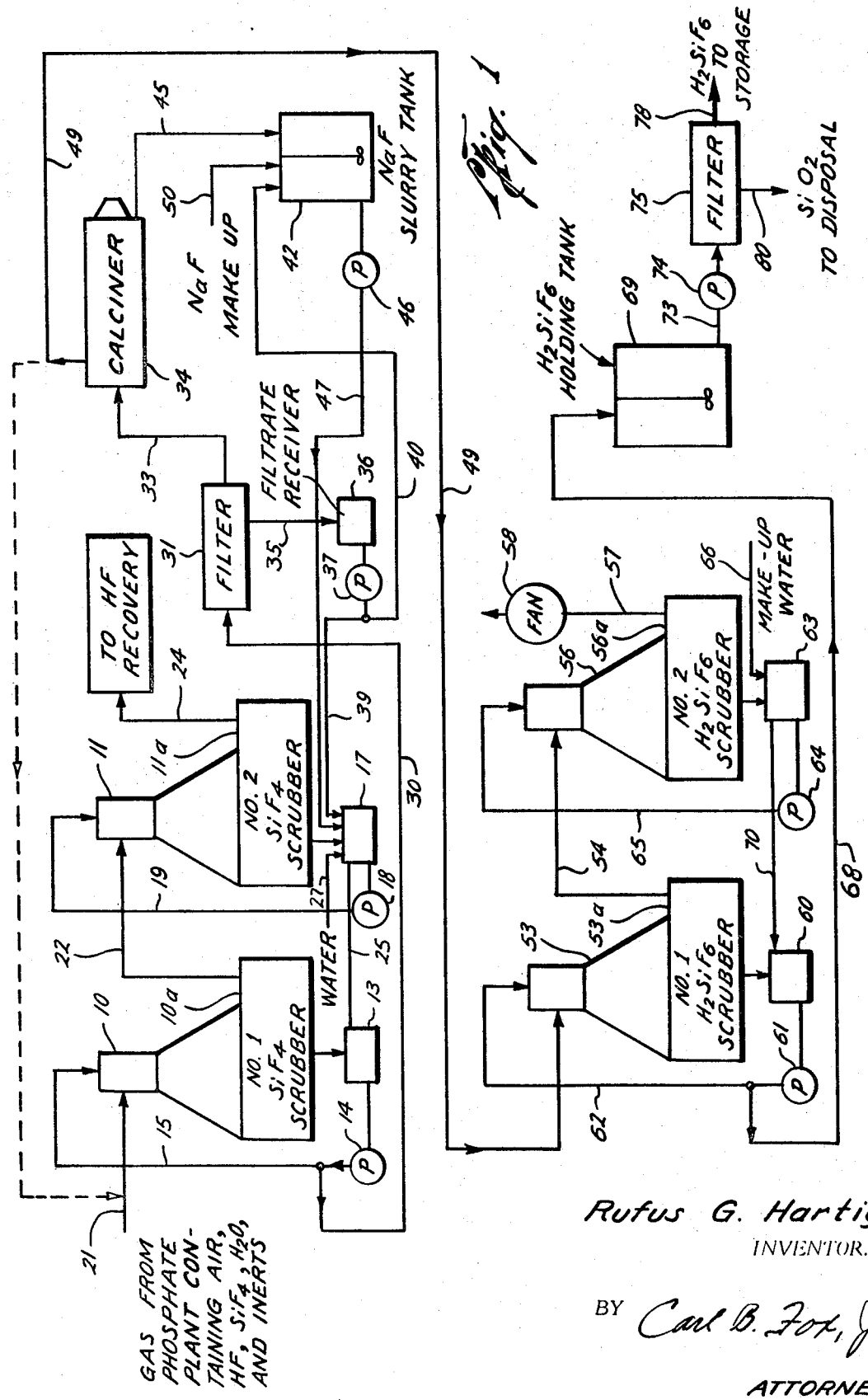
FIG. 1 is a flow diagram showing a preferred embodiment of process according to the invention.

In the manufacture of wet process phosphoric acid and related products, wherein the phosphate content of the products is derived from phosphate rock and is recovered by reaction of the phosphate rock with an acid, usually sulfuric acid, the silicon content of the phosphate rock in large measure is ultimately converted to vapor form as $SiF_4$, which, in order to prevent excessive air contamination in the area of the plant, is conventionally scrubbed from waste gases by water scrubbers whereby there results relatively large volumes of water solutions of $H_2SiF_6$. The gaseous $SiF_4$ reacts with HF, which is also present in the gaseous effluents from the phosphate plants, to produce $H_2SiF_6$, which results in solution in the scrubber water.

Disposal of such $H_2SiF_6$ solutions is difficult, since the materials therein produce stream contamination if the liquid effluents are merely dumped into surface waters, and in addition, the fluorine content is lost which is subject to recovery as the valuable product, HF.

The $H_2SiF_6$ solutions, for recovery of HF therefrom, are first heated to vaporize the $H_2SiF_6$, which breaks down into HF and $SiF_4$, water vapor also being present in the gases derived from the heating. The HF and $SiF_4$ gas along with the water vapor are heated to approximately 1,000 degrees F. to 1,400 degrees F. Most of the $SiF_4$ is converted to HF, as shown by the following reaction:

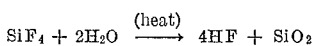

The $SiO_2$ is a very finely divided solid and most of the $SiO_2$ is removed from the gases in an electrostatic precipitator.

The present invention is concerned with treatment of gases of the type leaving the electrostatic precipitator to remove the remaining $SiF_4$ therefrom, and to produce a gas containing HF without interfering contaminants from which high-grade HF may be recovered. Therefore, the procedural steps hereinbefore mentioned are not shown in the drawings, but are exemplary steps for production of the gas to be treated according to the invention.

The gas stream of the type described contains water vapor ($H_2O$), hydrofluoric acid (HF), some silicon tetrafluoride ($SiF_4$), and gaseous products of combustion resulting from fuel and air used to heat the gas stream to break down the $H_2SiF_6$. The recovery of HF, according to one process, involves the reaction of HF with NaF to produce $NaHF_2$ according to the chemical reaction, $NaF + HF \rightarrow NaHF_2$. The $NaHF_2$ is then heated to liberate the HF, which is condensed to produce anhydrous HF, or can be passed through water scrubbers to produce aqueous HF solutions, this reaction being as follows:

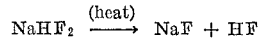

In this method of recovery of HF, the presence of $SiF_4$ in the gas stream causes a loss of fluorine product, and also causes a loss of NaF which is used to absorb and desorb the HF. The $SiF_4$ reacts with NaF to produce $Na_2SiF_6$ according to the reaction, $2NaF + SiF_4 \rightarrow Na_2SiF_6$.

To avoid this interference with the HF recovery procedure, and to keep the $Na_2SiF_6$ out of the NaF and $NaHF_2$ used in HF absorption and desorption, the gas stream is first treated, according to the invention, to remove the $SiF_4$ from the gas stream prior to the HF recovery system.

Referring now to FIG. 1 of the drawings, the gas stream as previously described, and containing HF, $SiF_4$, and water vapor, plus the combustion products, is passed through a pair of scrubbers 10, 11, designated in the drawing respectively as "NO. 1 $SiF_4$ SCRUBBER" and "NO. 2 $SiF_4$ SCRUBBER." These scrubbers each include a liquid collection compartment 10a, 11a, respectively. Scrubber liquor from compartment 10a passes to a pump tank 13 from which the liquid is pumped by pump 14 through line 15 for recycle to the top of the scrubber. Scrubber liquor from collection compartment 11a passes to pump tank 17 from which the scrubber liquor is circulated by pump 18 through line 19 to the top of scrubber 11. The incoming gas enters through a line 21 to the top of scrubber 10 and passes downwardly through the scrubber and through the upper portion of compartment 10a to pass through line 22 to the upper end of scrubber 11, then downwardly through scrubber 11 and through the upper part of compartment 11a to exit through a line 24. Scrubber liquor overflows from pump tank 17 to pump tank 13 through line 25. Make-up water for the scrubber system is added at 27.

The gas exiting from the scrubber system through line 24 passes to an HF recovery system, not shown in FIG. 1, wherein the HF is recovered for example by NaF—$NaHF_2$ absorption-desorption as has been mentioned.

Part of the recycle scrubber liquor circulated by pump 14 is passed through line 30 to a filter 31. The solids from filter 31, comprising $Na_2SiF_6$, are delivered as shown by line 33 to a calciner (kiln) 34. The filtrate from filter 31 passes through a line 35 to a filtrate receiver 36 from which it is pumped by pump 37, the pumped liquid passing through line 39 to pump tank 17 of scrubber 11 and through line 40 to NaF slurry tank 42.

NaF, resulting from the reaction $$Na_2SiF_6 \xrightarrow{(heat)} 2NaF + SiF_4$$

is delivered from calciner 34 through line 45 to NaF slurry tank 42. Pump 46 delivers NaF slurry through line 47 to pump tank 17 of scrubber 11, a part of the liquid in pump tank 17 overflowing to pump tank 13 of scrubber 10. The gas exiting from calciner 34 through line 49 contains $SiF_4$ resulting from the above chemical reaction.

The scrubber liquors of scrubbers 10, 11 contain sodium fluoride, resulting from calciner 34. NaF makeup is added at 50. Since the scrubbing of scrubbers 10, 11 is on a counterflow basis, the concentration of the scrubber liquor in scrubber 10 is higher than in scrubber 11. Particularly in the liquor in scrubber 11, an excess of $NaHF_2$ is maintained, resulting from the reaction, $$HF + NaF \rightarrow NaHF_2$$

in order that the solubility of $Na_2SiF_6$, resulting from the reaction, $SiF_4 + 2NaF \rightarrow Na_2SiF_6$, can be kept relatively low. The effectiveness of the invention results from the fact that the $Na_2SiF_6$ is rendered insoluble by the excess of $NaHF_2$ in the scrubber liquors, thereby reducing the partial vapor pressure of $SiF_4$ in the scrubbers so that the scrubbing results in substantially complete removal of $SiF_4$ from the gas stream passing through the scrubbers. Therefore, the gas exiting from the scrubber through line 24 is virtually free of $SiF_4$.

Since the scrubber liquors of scrubbers 10, 11 contain $NaHF_2$, and the NaF added thereto being all converted in the scrubbers to $NaHF_2$ and $Na_2SiF_6$, HF passes through these scrubbers to exit with the gas stream through line 24, to be recovered in other equipment, not shown in FIG. 1.

The gases leaving calciner 34 through line 49 contain $SiF_4$, resulting from the chemical reaction, $$Na_2SiF_6 \xrightarrow{(heat)} 2NaF + SiF_4$$

These gases are delivered to a scrubber 53 having a lower liquid compartment 53a, the gases passing downwardly through the scrubber and across the upper portion of compartment 53a and continuing through line 54 to the upper portion of a second scrubber 56 which has a lower liquid compartment 56a. After passing through this second scrubber 56, the gases are withdrawn from the system through line 57 and fan 58.

Scrubbers 53, 56 are water scrubbers, wherein the gases delivered through line 49 are water scrubbed to dissolve $SiF_4$, the water and $SiF_4$ reacting according to the chemical reaction, $3SiF_4 + 2H_2O \rightarrow 2H_2SiF_6 + SiO_2$. The scrubing liquor is recirculated from scruber 53 through pump tank 60, pump 61, and recirculation line 62. Scrubber liquor of scrubber 56 is recirculated through pump tank 63, pump 64 and recirculation line 65. Make up water is added at 66 to pump tank 63. A part of the scrubber liquor recycle of scrubber 53 is withdrawn through line 68 and delivered to holding tank 69 which contains $H_2SiF_6$ in water solution.

Scrubber liquor from pump tank 63 is delivered through line 70 to pump tank 60.

$H_2SiF_6$ in water solution is delivered by line 73 and pump 74 to a filter 75. The $H_2SiF_6$ solution is withdrawn from filter 75 at 78 for storage. The solid $SiO_2$ removed by filter 75 is removed via 80 and disposed of or utilized in any desired manner.

As is indicated by the above reaction $$3SiF_4 + 2H_2O \rightarrow 2H_2SiF_6 + SiO_2$$

one third of the silicon content is in suspension in tank 69 and is removed at filter 75. The $H_2SiF_6$ solution at 78 may be recirculated through the system and heated to again produce HF and $SiF_4$ in gaseous form for feeding through line 21 into scrubber 10. Therefore, $SiO_2$ is continuously removed from the system at 80 whereby the gases passing through line 24 to an HF recovery system are of nil silicon content so that $NaF$—$NaHF_2$ absorption-desorption system utilized to recover purified HF will not be subjected to contamination.

If desired, the gas stream containing $SiF_4$ which leaves the calciner through line 49 can be returned and recycled via the plant scrubbers and electrostatic precipitator (not shown) to the gases in line 21, eliminating production of $H_2SiF_6$ and subsequent vaporization.

Figure 2:
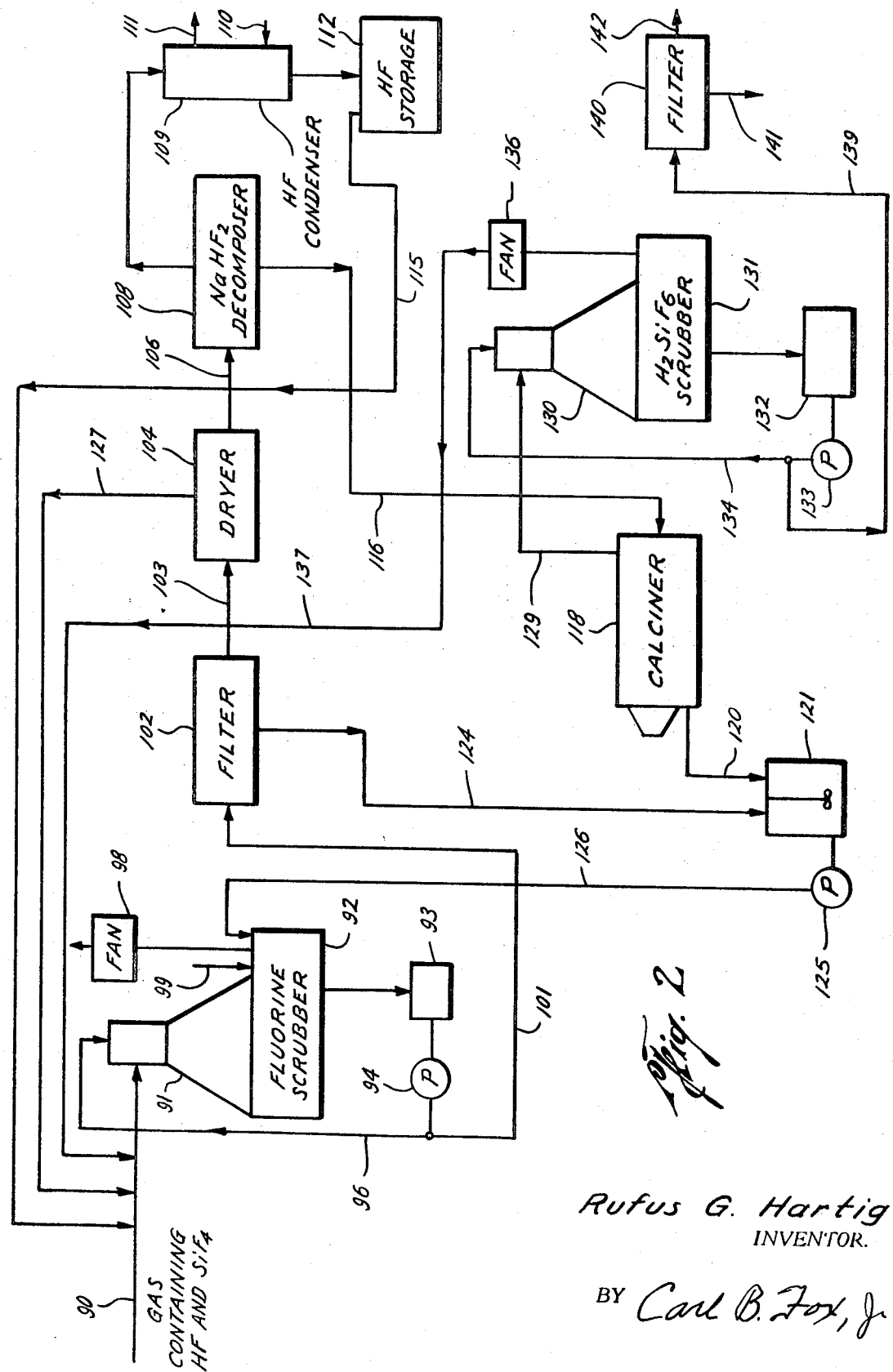
FIG. 2 is a flow diagram showing a modified process according to the invention.

Referring now to FIG. 2 of the drawings, which shows a modified process the gas stream containing HF and $SiF_4$, as in line 21 of FIG. 1, is fed through line 90 into the upper end of scrubbing tower 91. A water slurry of NaF, $NaHF_2$, and $Na_2SiF_6$ is used as scrubber liquor in tower 91, an excess of NaF being maintained in the scrubber liquor. HF is removed from the gas stream entering through line 90 and passing down the scrubber according to the reaction $HF + NaF \rightarrow NaHF_2$, and $SiF_4$ is removed from the gases according to the reaction, $$SiF_4 + 2NaF \xrightarrow{(heat)} Na_2SiF_6$$

Scruber 91 has a lower compartment 92 from which scrubber liquor drains to pump tank 93, from which the liquor is pumped by pump 94 through line 96 for recycling downwardly through the tower. The scrubber gas is withdrawn from the tower by a fan 98. Make-up water is added to compartment 92 through line 99. The maintenance of an excess of NaF in the scrubber liquor insures that virtually all of the fluorine compounds, HF and $SiF_4$, are scrubbed from the gas.

A portion of the scrubber liquor is continuously withdrawn from tower 91 through line 101 and delivered to a filter 102. The solids, NaF, $NaHF_2$, and $Na_2SiF_6$, are delivered via conveyor 103 to a dryer 104, wherein the solids are dried at a temperature below the $NaHF_2$ decomposition temperature. The dried solids are delivered via conveyor 106 into a decomposer 108, wherein the $NaHF_2$ is decomposed by heat, the solids being heated to approximately 550° F. to release HF according to the reaction.

$$NaHF_2 \xrightarrow{(heat)} HF + NaF$$

The HF driven off in decomposer 108 is passed downwardly through condenser 109, cooled indirectly by cooling water fed through line 110 and discharged through line 111, the condensed HF passing downwardly into HF storage tank 112. The vent 115 from HF storage is returned to gas line 90.

After decomposition of the $NaHF_2$ in decomposer 108, the remaining solids are passed by a conveyor 116 to calciner 118, wherein the $Na_2SiF_6$ is heated to approximately 1300° F., producing gaseous $SiF_4$ and solid NaF according to the reaction, $$Na_2SiF_6 \xrightarrow{(heat)} SiF_4 + 2NaF$$

The NaF is discharged from calciner 118 via conveyor 120 into an agitator-equipped tank 121, wherein the NaF is mixed with filtrate from filter 102 entering through line 124. Pump 125 delivers the slurry through line 126 into compartment 92 of scrubber 91.

Steam from dryer 104 is delivered through line 127 to line 90 where the steam is mixed with the incoming gases to scrubber 91.

Gaseous $SiF_4$ is passed from calciner 118 through line 129 to the top of a scrubbing tower 130, in which the $SiF_4$ is removed from the gas stream by water scrubbing. Scrubber 130 has a liquid compartment 131 at its lower end, from which scrubbing liquor is recycled through pump tank 132, by a pump 133 and line 134 to the top of the tower. Fan 136 withdraws the scrubbed gases by way of line 137 which leads to line 90 where the gases are mixed with the incoming gases to scrubber 91.

A portion of the scrubber liquor of tower 130 is continuously withdrawn through line 139 to a filter 140. A water solution of $H_2SiF_6$ is withdrawn from filter 140 through line 141, the reaction between $SiF_4$ and $H_2O$ in tower 130 being $3SiF_4 + 2H_2O \rightarrow 2H_2SiF_6 + SiO_2$.

The filter cake, consisting of $SiO_2$ wetted with water solution of $H_2SiF_6$, is discharged through line 142. Washing of the cake may be provided if desired.

Material balances for the systems of both FIG. 1 and FIG. 2 may be readily calculated on the basis of stoichiometric considerations. The amount of silicon removed is the same in each case. The HF produced in each case is silicon-free.

While the flowsheets of both FIG. 1 and FIG. 2 have been described with the use of NaF—$NaHF_2$ absorption-desorption, it is possible and at times advantageous to use KF—$KHF_2$ or $BaF_2$, or mixtures of any of the materials, for the absorption and desorption. The solubilities of $Na_2SiF_6$, $K_2SiF_6$, and $BaSiF_6$ are not the same, and since the degrees of silicon removal depends on the vapor pressure of $SiF_4$ in towers 10, 11 (FIG. 1) and in tower 91 (FIG. 2), or conversely, on the insolubility of $Na_2SiF_6$ in the towers, the $SiF_4$ removal may be enhanced by using a KF—$KHF_2$ or $BaF_2$ system. $BaHF_2$ does not form, and $BaF_2$ is more soluble than $BaSiF_6$. The solubility (in water) of $K_2SiF_6$ is about one-fourth the solubility of $Na_2SiF_6$, and the solubility (in water) of $BaSiF_6$ is about one twenty-eighth that of $Na_2SiF_6$, so that the $SiF_4$ vapor pressure in the scrubbing towers may be reduced proportionally to the solubilities. The decomposition temperatures of $Na_2SiF_6$, $K_2SiF_6$ and $BaSiF_6$ differ, also and lower temperatures of decomposition in calciner 34 or 118 may be used if the barium salts are used, instead of the sodium salts. $K_2SiF_6$ has a higher decomposition temperature, thereby ensuring virtual elimination of $SiF_4$ traces in the HF product. These considerations, as well as the relative costs of the materials, should be considered both from an operating and economic standpoint in determining which material or mixture to use.

Exemplifying the operation of the flow system of FIG. 1, an effluent gas from a phosphate complex, containing HF and $SiF_4$, and trace amounts of $SiO_2$ not removed by an electrostatic precipitator, were treated in the described manner. A 5–10% excess of dissolved $NaHF_2$ was maintained in the mother liquir of scrubbers 10, 11. The gases at line 24 had nil silicon content. $SiF_4$ was dissolved in scrubbers 53, 56, producing a 15%–20% $H_2SiF_6$ solution. The HF produced from the gases in line 24 was silicon-free, and very high grade.

Similar results were obtained using the process according to FIG. 2. An excess of NaF up to 5% by weight was maintained in scrubber 91, and the scrubbed gases exhausted by fan 98 were of nil silicon and fluorine content. The solids decomposed as described in decomposer 108 to produce HF of good purity, and in calciner 118 to liberate $SiF_4$. The $SiF_4$ was scrubbed out at scrubber 130, producing a water solution of about 15%–20% $H_2SiF_6$.

The $SiF_4$ removal permits manufacture of very high-grade, silicon-free, hydrogen fluoride, either anhydrous or in water solution, and has resulted in many benefits, particular in view of the relative simplicity and high effectiveness of the processes.

While preferred embodiments of the invention have been shown in the drawings and described, many modifications thereof may be made by a person skilled in the art without departing from the spirit of the invention, and it is intended to protect by Letters Patent all forms of the invention falling within the scope of the following claims:

I claim:
1. A process for removal of silicon compounds from gases containing hydrogen fluoride and silicon primarily in the form of $SiF_4$, and for the recovery of hydrogen fluoride from said gases, comprising contacting said gases with an aqueous suspension of one or more compositions selected from the group consisting of (1) NaF and $NaHF_2$ and (2) KF and $KHF_2$, and wherein the selected composition or compositions of said (1) NaF and $NaHF_2$ and (2) KF and $KHF_2$ is maintained in excess to suppress absorption of hydrogen fluoride by said aqueous suspension, to produce a $SiF_4$-free gas containing hydrogen fluoride and to precipitate the $SiF_4$ from the gas as fluosilicate salt, separating the solids comprising said fluosilicate salt and suspended substances from said aqueous suspension, heating said separated solid to decompose said fluosilicate salt to evolve $SiF_4$ and to recover said one or more compositions selected from the group consisting of (1) NaF and $NaHF_2$ and (2) KF and $KHF_2$, absorbing the evolved $SiF_4$ in water to form an equeous solution of $H_2SIF_6$ having solids $SiO_2$ suspended therein according to the chemical reaction, $3SiF_4 + 2H_2O \rightarrow 2H_2SiF_6 + SiO_2$, separating the $SiO_2$ from said aqueous solution of $H_2SiF_6$, and separately recovering the $SiF_4$-free gas containing the hydrogen fluoride earlier obtained from the contacting of the gases with the said aqueous suspension.

2. Process according to claim 1, including heating the aqueous solution of $H_2SiF_6$ to form hydrogen fluoride and $SiF_4$ according to the chemical reaction $$H_2SiF_6 \xrightarrow{\text{(heat)}} 2HF + SiF_4$$

and recycling the HF and $SiF_4$ to said initial gases to be recontacted with said aqueous suspension.

References Cited

UNITED STATES PATENTS

| | | | |
|---|---|---|---|
| 2,588,786 | 3/1952 | Winter | 23—153 |
| 2,819,151 | 1/1958 | Flemmert | 23—182 |
| 3,087,787 | 4/1963 | Flemmert | 23—153 |
| 3,218,124 | 11/1965 | Oakley, Jr., et al. | 23—153 |
| 3,219,410 | 11/1965 | Dexter et al. | 23—153 |
| 3,256,062 | 6/1966 | Wylegala | 23—153 |
| 3,258,308 | 6/1966 | Peterson et al. | 23—88 |
| 3,273,713 | 9/1966 | Parish | 23—153 |
| 3,273,963 | 9/1966 | Gunn, Jr. | 23—153X |

EDWARD STERN, Primary Examiner

U.S. Cl. X.R.

23—88, 182, 205